(12) United States Patent
Veldkamp et al.

(10) Patent No.: US 8,695,782 B2
(45) Date of Patent: Apr. 15, 2014

(54) CONVEYING SYSTEM FOR MOVING FOOD PRODUCTS AND METHOD OF USING THE SAME

(75) Inventors: Brent M. Veldkamp, Cumming, IA (US); Andrew W. Maddux, West Des Moines, IA (US); Colin R. Hart, Ankeny, IA (US); Kenneth L. Lebsack, Ankeny, IA (US); Joshua W. Higgins, Bondurant, IA (US); Craig A. Smiens, Ankeny, IA (US)

(73) Assignee: Marel Meat Processing Inc., Des Moines, IA (US)

( * ) Notice: Subject to any disclaimer, the term of this patent is extended or adjusted under 35 U.S.C. 154(b) by 49 days.

(21) Appl. No.: 13/454,181

(22) Filed: Apr. 24, 2012

(65) Prior Publication Data
US 2013/0277174 A1    Oct. 24, 2013

(51) Int. Cl.
*B65G 47/26*    (2006.01)
*B65G 47/31*    (2006.01)
*B65G 43/08*    (2006.01)

(52) U.S. Cl.
CPC ............... *B65G 47/31* (2013.01); *B65G 43/08* (2013.01)
USPC ..................................... 198/460.1; 198/461.2

(58) Field of Classification Search
CPC ........ B65G 43/08; B65G 47/31; B65G 15/12; B65G 2203/042; H05K 13/0061
USPC .......................... 198/460.1, 461.1, 461.2, 817
See application file for complete search history.

(56) References Cited

U.S. PATENT DOCUMENTS

| | | | |
|---|---|---|---|
| 3,335,841 A * | 8/1967 | Klingel et al. | 198/460.1 |
| 3,938,650 A * | 2/1976 | Holt | 198/461.2 |
| 4,120,393 A * | 10/1978 | Motooka et al. | 198/460.1 |
| 4,934,509 A * | 6/1990 | Gilgien | 198/460.1 |
| 5,022,511 A * | 6/1991 | Gorrieri et al. | 198/460.1 |
| 6,098,785 A * | 8/2000 | Van Maanen | 198/461.1 |
| 7,341,141 B2 * | 3/2008 | Spatafora | 198/460.2 |
| 8,490,775 B2 * | 7/2013 | Volk et al. | 198/419.3 |

* cited by examiner

*Primary Examiner* — James R Bidwell
(74) *Attorney, Agent, or Firm* — Zarley Law Firm, P.L.C.

(57) ABSTRACT

A conveying system that corrects spacing inconsistencies between food products on transport conveyors. Sensor elements are used to determine the position of food products on a first conveyor. Displacement members then move the food products to a slower second conveyor and different locations to correct the position between the food products.

13 Claims, 3 Drawing Sheets

US 8,695,782 B2

CONVEYING SYSTEM FOR MOVING FOOD PRODUCTS AND METHOD OF USING THE SAME

BACKGROUND OF THE INVENTION

This system relates to the packing of food products. More specifically this invention relates to transporting food products to a loader.

When meat products such as sausages or hotdogs are made and taken from an oven the product must be conveyed to a loader to be loaded for a packaging machine. For certain types of loaders the sausage is conveyed end to end. In the sausage arts in order to properly load the links of sausages the pitch or spacing between the links must be a minimum of 40 mm between the links. This spacing is required for proper operation of the loader. Currently, a plurality of conveyors are used to transport the links where each successive conveyor transports the links at a higher rate than the last to ensure the space between the links exceeds the minimum distance. By having a second conveyor moving at a speed faster than a first conveyor when a first link in moved onto the second conveyor it is moving at a speed greater than the first conveyor. This increases the distance between the links.

As a result of this effect, multiple conveyors being used, and the initial inconsistency of the spacing between sausages, the spacing between the links on an average becomes significantly more than the minimum 40 mm required for spacing. Consequently, the amount of links loaded decreases because of this excess spacing. Additionally, increasing conveyor speeds is also problematic because the loader can only handle in-taking links at a certain velocity. Above this speed the links tend to not go into the loader as desired which can result in a pile up of sausages causing the machine to have to be shut down further reducing production.

Therefore, a principal objective of the present invention is to control the average spacing between conveyed food products.

Yet another aspect of the present invention is to increase the efficiency of the conveyance process in packaging meat products.

These and other objectives, features and advantages will become apparent from the specification and claims.

BRIEF SUMMARY OF THE INVENTION

A conveying system for moving food products that utilizes a first conveyor that receives and conveys the food products at a first predetermined speed. A sensor element determines the position of food products on the first conveyor. Based on the position of the food products one of a plurality of displacement members that are spaced along the first conveyor is chosen to actuate to move a food product from the first conveyor onto a second conveyor that has a second predetermined speed.

DETAILED DESCRIPTION OF THE PREFERRED EMBODIMENT

Figure 1:
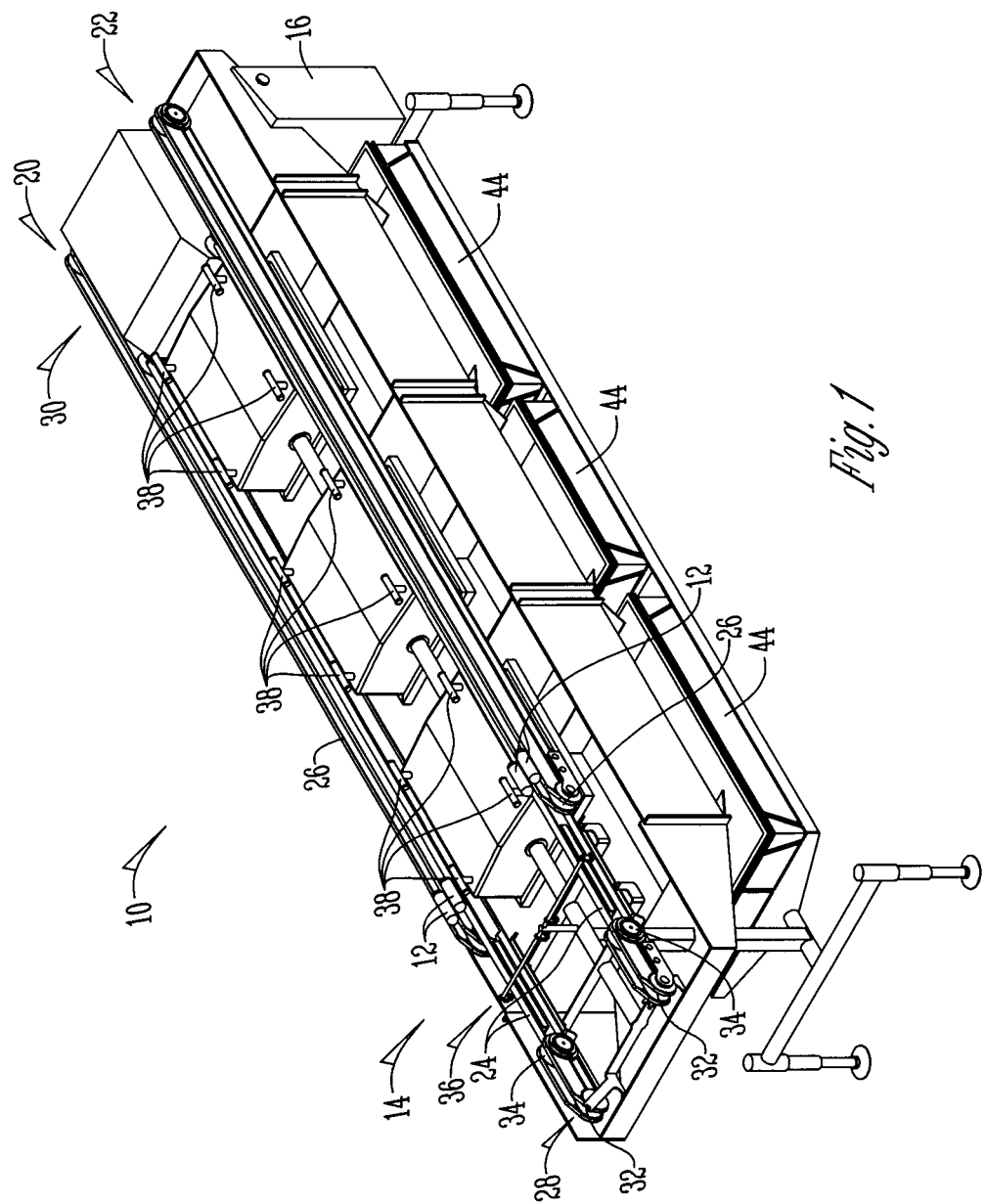
FIG. 1 is a perspective view of a conveying system.
Figure 2:
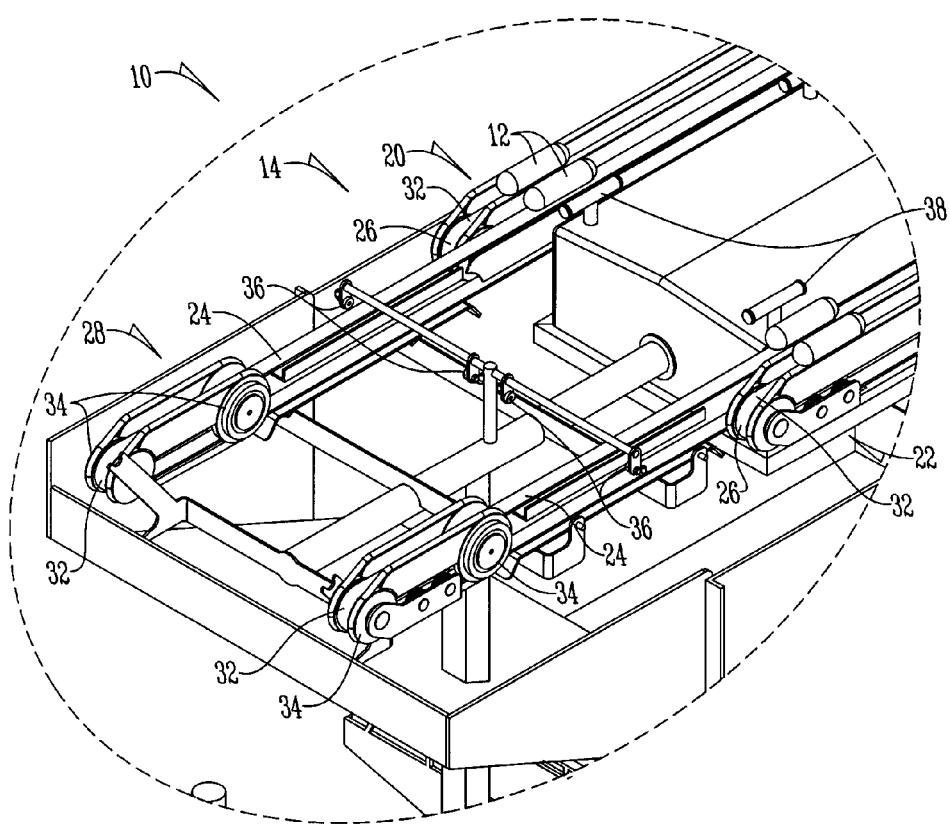
FIG. 2 is a cut away perspective view of a conveying system.
Figure 3:
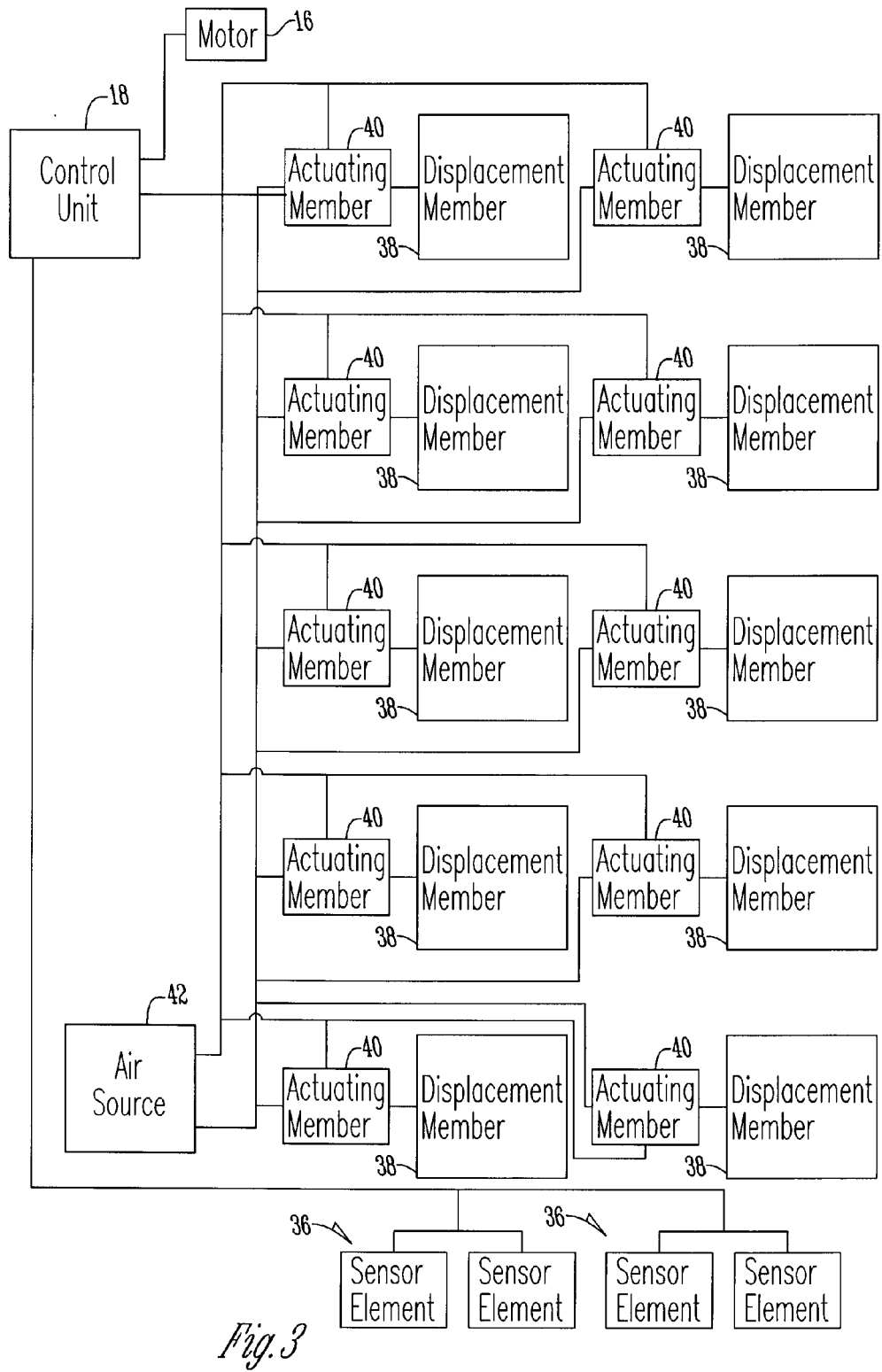
FIG. 3 is a schematic diagram of a conveying system.

The figures show a conveying system 10 used to convey a food or meat product 12 from a first location such as an oven to a second location such as a loading or packaging device. The food product 12 can be a sausage, hotdog, piece of beef, pork, veal, or the like. The conveying system 10 has a frame 14 that houses a motor 16 and optionally can house a control unit 18. In another embodiment the control unit 18 can be located at a loader (not shown) or other remote location. The motor 16 operates or actuates first and second sets of conveyors 20 and 22.

Each of the sets of conveyors 20 and 22 have first and second conveyors 24 and 26 that run parallel to one another the length of the frame 14 from a first end 28 to a second end 30. The first and second conveyors 24 and 26 of each set 20 and 22 are adjacent to one another and have conveying surfaces 32 that receive and hold in place food products 12. In one embodiment the conveying surface is a V-belt whereas in another embodiment O-rings are used to contain the food product as is known in the art. Each conveying surface is moved utilizing pulleys 34 as is also known in the art.

Sensor elements 36 are located at the first end 28 of the frame 14 adjacent the first conveyor 24 of the sets 20 and 22 of conveyors. The sensor elements 36 detect the presence of the food product 12 and sends an electronic signal to the control unit 18 that is used to determine the distance between food products 12.

A plurality of displacement members 38 are secured to the frame 14 and extend in spaced apart relation from the first end 28 of the frame 14 to the second end 30 of the frame 14. Each displacement member 38 is located adjacent the first conveyors 24 such that when actuated the displacement member 38 can move a food product 12 from a first conveyor 24 to a second conveyor 26. In addition, each displacement member 38 is placed at a predetermined location along the frame 14 and spaced apart from one another and each displacement member 38 has an actuating member 40 such as a valve so that each displacement member 38 is independently operated to move food product 12 from a first conveyor 24 to a second conveyor 26. In one embodiment each displacement member 38 is a nozzle that utilizes air from an air source 42 that has filters to blow the food product 12 from a first conveyor 24 to a second conveyor 26. Alternatively, a mechanical gate could physically push the food product, or another type of displacement member 38 could be utilized without falling outside the scope of the present disclosure.

A plurality of bins 44 are secured to the frame 14 and overlap underneath the sets of conveyors 20 and 22. Thus, if during the moving process food products 12 are not received by the second conveyors 26, they fall off the conveyors into the bins 44. This prevents such loose food product 12 from engaging other food products and keeps the area and system 10 sanitary.

In operation, in one embodiment, a desired position of a food product 12 is determined prior to delivery of the food product 12 to the conveyor system 10 and stored in the control unit 18. When the product 12 is delivered to the first end 28 of the first conveyors 24, sensor 36 detects the presence of the food product 12 on the conveyor 24 and sends a signal to the controller 18. The controller 18 determines the position of the food product 12 on the first conveyor 24 and compares the sensed position with the predetermined desired position. Based upon this comparison, the control unit 18 sends a signal to a selected actuating member 40 at a calculated time to adjust the spacing between food products 12 to an acceptable range. Preferably, when the sensed position and the desired position are equal or within an acceptable range, the control unit 18 activates a displacement member near the middle of the first conveyor 24 to transfer the product to the second conveyor 26. When the sensed position is downstream (or ahead) of the desired position, the control unit 18 activates a displacement member closer to the first end 28 of the first conveyor 24. When the sensed position of the food product 12 is upstream (or behind) the desired position, the control unit sends a signal to activate a displacement member closer to the second end 30 of the first conveyor 24. In this manner, the spacing between the food product is adjusted to an acceptable range based upon a comparison of the sensed product position and the desired product position.

In an alternative embodiment, to eliminate the need of determining and comparing to a predetermined position, activation is based upon the sensed position of the product 12. In this embodiment, as product 12 is delivered to the first end 28 of the first conveyor 24 and the sensor 36 detects the presence of the product 12, a signal is sent to the control unit 18 and the position of the product 12 is recorded and/or saved in memory.

When the next product 12 is sensed, a second signal is sent to the control unit 18 where the position of the second product is determined and recorded or saved in memory. The control unit then compares the position of the first product to the position of the second product and determines the spacing between the two. Based upon a comparison of the determined spacing with a desired minimum spacing, the control unit 18 sends a signal to activate a selected displacement member 38 closest to the second end 30 of the first conveyor 24 to achieve the desired minimum spacing between products. Thus, if the products are too close together a selected displacement member 38 closer to the first end 28 and further away from the second end 30 is actuated. When the calculated spacing is greater than the desired spacing, a displacement member 38 closer to the second end 30 is actuated. The greater the difference between the calculated spacing and the desired spacing, the closer to the second end 30 will be the actuated displacement member.

Thus provided is a system and method that corrects the distance between food product 12 on conveyors 24 and 26 during the transportation of the food products 12. As a result the distance between each product as an average is minimized, allowing more products to be loaded without having to speed up a conveyor. Because the conveyor does not have to speed up, problems with loading too quickly are eliminated. In addition, the design of the belt mounting allows the belts to be replaced with minimal effort. Thus, at the very least all of the stated objectives have been met.

What is claimed is:

1. A conveying system for moving food products comprising:
   a first conveyor having a first end and second end for conveying a plurality of spaced apart food products and moving at a first predetermined speed;
   at least one sensor element positioned to detect a position of a food product;
   a plurality of spaced apart displacement members in electric communication with the at least one sensor;
   wherein based on the detected position of the food product one of the plurality of spaced apart displacement members is actuated to move a food product from the first conveyor to a second conveyor that runs parallel to the first conveyor and is moving at a second predetermined speed.

2. The conveying system of claim 1 wherein the plurality of spaced apart displacement members are pneumatically actuated.

3. The conveying system of claim 1 wherein the first predetermined speed is faster than the second predetermined speed.

4. The conveying system of claim 1 wherein the actuation of the one of a plurality of displacement members is determined based upon a comparison of the detected position of the food product with a predetermined desired position of the food product.

5. The conveying system of claim 4 wherein a displacement member near a midpoint of the first conveyor is actuated when the detected position and desired position are within an acceptable range, a displacement member near the first end is actuated when the detected position is ahead of the desired position, and a displacement member near the second end is actuated when the detected position is behind the desired position.

6. The conveying system of claim 1 wherein the actuation of the one of a plurality of displacement members is determined based upon a calculated spacing between a first product position and a second product position as compared to a desired minimum spacing.

7. The conveying system of claim 1 wherein the first and second conveyors are a first set of conveyors.

8. The conveying system of claim 7 further comprising a second set of first and second conveyors.

9. The conveying system of claim 1 wherein the food products are sausages.

10. A method of conveying food product to a loader steps comprising:
    conveying spaced apart food products on a first conveyor moving at a first predetermined speed;
    detecting the position of a food product with a sensor element; and
    moving a food product at a predetermined location from the first conveyor to a second conveyor that runs parallel to the first conveyor and is moving at a second predetermined speed based on the detected position of the food product.

11. The conveying system of claim 10 wherein the actuation of the one of a plurality of displacement members is determined based upon a comparison of the detected position of the food product with a predetermined desired position of the food product.

12. The conveying system of claim 11 wherein a displacement member near a midpoint of the first conveyor is actuated when the detected position and desired position are within an acceptable range, a displacement member near the first end is actuated when the detected position is ahead of the desired position, and a displacement member near the second end is actuated when the detected position is behind the desired position.

13. The conveying system of claim 10 wherein the actuation of the one of a plurality of displacement members is determined based upon a calculated spacing between a first product position and a second product position as compared to a desired minimum spacing.

* * * * *